United States Patent [19]

Mueller et al.

[11] Patent Number: 5,405,819
[45] Date of Patent: Apr. 11, 1995

[54] PHILLIPS CATALYST FOR THE POLYMERIZATION OF α-OLEFINS

[75] Inventors: Hans-Joachim Mueller; Hans-Georg Braun, both of Gruenstadt; Bernd L. Marczinke, Speyer; Ulrich Mueller, Neustadt, all of Germany

[73] Assignee: BASF Aktiengesellschaft, Ludwigshafen, Germany

[21] Appl. No.: 110,218

[22] Filed: Aug. 23, 1993

[30] Foreign Application Priority Data

Aug. 29, 1992 [DE] Germany .................. 42 28 883.5

[51] Int. Cl.$^6$ .................. B01J 27/188; B01J 27/182
[52] U.S. Cl. .................. 502/210; 502/214; 502/232; 502/240
[58] Field of Search .................. 502/210, 214, 232, 240

[56] References Cited

U.S. PATENT DOCUMENTS

| | | | |
|---|---|---|---|
| 4,364,842 | 12/1982 | McDaniel et al. | 502/210 |
| 4,397,765 | 8/1983 | McDaniel | 502/210 |
| 4,814,308 | 3/1989 | Konrad et al. | 502/210 |
| 5,034,364 | 7/1991 | Kral et al. | 502/117 |

*Primary Examiner*—Helen M. S. Sneed
*Assistant Examiner*—E. D. Irzinski
*Attorney, Agent, or Firm*—Keil & Weinkauf

[57] ABSTRACT

A Phillips catalyst for the polymerization of α-olefins, containing, as a catalytically active component, at least one chromium(III) compound on a silicon aluminum phosphate carrier of the general formula (I)

$$(Si_xAl_yP_z)O_2 \qquad (I)$$

where x is from 0.05 to 0.5 and y and z are each from 0.1 to 1.0, exhibits in particular high productivity and is preferably used for the preparation of homo- and co-polymers of ethylene.

5 Claims, No Drawings

PHILLIPS CATALYST FOR THE POLYMERIZATION OF α-OLEFINS

The present invention relates to a Phillips catalyst for the polymerization of α-olefins, containing, as a catalytically active component, at least one chromium(III) compound on a silicon aluminum phosphate carrier of the general formula (I)

$$(Si_xAl_yP_z)O_2 \quad (I)$$

where x is from 0.05 to 0.5, and y and z are each from 0.1 to 1.0.

The present invention furthermore relates to a process for the preparation of such a catalyst and to polymers of α-olefins obtainable with the aid of these catalysts by a process likewise according to the invention.

Supported chromium compounds function as catalytically active components of the Phillips catalysts, as are known to be used for the copolymerization of ethylene and α-olefins by the suspension polymerization method. In addition to silica gel and aluminum phosphate, alumina/silica cogels-or aluminum silicate gels are also used as carriers in the chromium catalysts (cf. U.S. Pat. No. 2,825,721 or U.S. Pat. No. 2,930,789). In the preparation of the chromium catalysts, apart from chromium it is also possible to apply phosphorus compounds to the finely divided aluminum silicate gels. Phosphoric acid (cf. U.S. Pat. No. 2,945,015) or organophosphorus compounds, such as alkyl phosphates ( cf. DE-A 25 02 940 ), are usually used for this purpose. These phosphorus compounds can be reacted with the chromium trioxide usually used, under the conditions used in the preparation of the catalyst intermediates, to give chromium- and phosphorus-containing compounds, which are finally applied to the aluminum silicate gels.

Phillips catalysts which contain finely divided, silicate-supported, phosphorus-containing chromium catalysts in the preparation of which the silicate gel or the phosphorus- and chromium-containing catalyst intermediate are treated with organoaluminum compounds are also known (cf. DE-A 28 20 860 or DE-A 26 10 422). The relevant Phillips catalysts give polymers having high melt flow indices, but their productivity is still very unsatisfactory.

Furthermore, EP-A 075 421 describes chromium catalysts for the polymerization of ethylene which is supported on zeolites having a clearly defined structure. Compared with materials without a defined structure, carriers having a defined structure have the advantage that they can be readily used in accordance with structure/activity principles of polymerization catalysts. Usually, such structurally defined carriers are only of limited use as polymerization -catalysts since their productivities are unsatisfactory. This is due in particular to the fact that such carriers have a high strength which prevents fragmentation of the carrier, which is otherwise usual in the case of Ziegler and Phillips catalysts.

It is an object of the present invention to provide a novel Phillips catalyst which has a clearly defined structure and in particular possesses a productivity which is higher than that of the prior art.

We have found that this object is achieved by the Phillips catalyst defined at the outset for the polymerization of α-olefins, containing, as a catalytically active component, at least one chromium(III) compound on a silicon aluminum phosphate carrier of the general formula (I)

$$(Si_xAl_yP_z)O_2 \quad (I)$$

where x is from 0.05 to 0.5, and y and z are each from 0.1 to 1.0.

In particular, a carrier of the general formula (I) where x is from 0.08 to 0.4, y is from 0.2 to 0.8 and z is from 0.1 to 0.8 is used as the silicon aluminum phosphate carrier for the novel Phillips catalyst. A particularly preferred carrier of the general formula (I) contains silicon, aluminum, phosphorus and oxygen in ratios such that x is from 0.1 to 0.2, y is from 0.3 to 0.5 and z is from 0.2 to 0.6. The preparation of such silicon aluminum phosphate carriers is disclosed in, inter alia, U.S. Pat. No. 4,440,871.

Silicon aluminum phosphate carriers which have a pore volume of from 0.1 to 1.0, in particular from 0.2 to 0.8, $cm^3/g$ and an equivalent specific surface area of 150 to 800, in particular from 250 to 500, $m^2/g$ are usually used in the novel Phillips catalyst.

The novel Phillips catalyst furthermore contains at least one chromium(III) compound, usually water-soluble salts of trivalent chromium or chromium(III) chelate complexes. Examples of suitable water-soluble salts of trivalent chromium include chromium(III) nitrate and acetate, of which chromium(III) nitrate is very particularly advantageous and is very particularly preferably used for the preparation of the Phillips catalysts. Examples of suitable chromium(III) chelate complexes are the acetylacetonate complexes of the general formula (II)

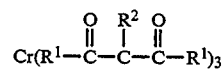

where $R^1$ is $C_1$-$C_{12}$-alkyl and $R^2$ is hydrogen or a radical $R^1$. An example of a particularly suitable acetylacetonatochromium(III) complex is trisacetylacetonatochromium(III), which is very particularly advantageous and is very particularly preferably used for the preparation of the Phillips catalysts.

Such chromium(III) compounds can be prepared by conventional methods of chemical synthesis, so that further explanations in this context are unnecessary.

In the novel Phillips catalyst, the silicone aluminum phosphate carrier of the general formula (I) and the chromium(III) compound are used in conventional ratios. The silicon aluminum phosphate carrier on the one hand and the chromium(III) compound on the other hand are preferably present in the catalyst in amounts such that the prepared Phillips catalyst has an atomic ratio of chromium to phosphorus of from 0.1:1 to 1:0.1, in particular from 0.5:1 to 1:0.5.

Regardless of the method by which the Phillips catalyst is prepared, the amounts of the chromium(III) compounds to be used according to the invention and of the silicon aluminum phosphate carriers of the general formula (I) are preferably chosen so that the prepared Phillips catalyst has a chromium content of from 0.1 to 5.0, in particular from 0.5 to 2.0, % by weight and a phosphorus content of from 0.1 to 4.0, in particular from 1.0 to 2.0, % by weight.

The novel Phillips catalyst is usually prepared by a multistage process in which the silicon aluminum phosphate carrier of the general formula (I) is first converted into a suspension with an alkanol. Thereafter, a chromium(III) compound is added to this suspension and the solvent, ie. the alkanol, is removed. The solid obtained in this manner is then activated by oxidation.

The conversion of the silicon aluminum phosphate carrier of the general formula (I) into a suspension with the alkanol is usually carried out at room temperature by mixing for from 10 to 60 minutes, in the presence or absence of an inert gas, for example nitrogen or argon. The alkanols used are in particular $C_1$-$C_8$-alkanols. Methanol, ethanol and n- and isopropanol are preferably employed.

The suspension obtainable in this manner is then reacted with the chromium(III) compound to be used according to the invention, preferably at from 30° to 100° C., in particular from 60° to 90° C. for from 10 to 60 minutes, and the mixture is stirred. The alkanol is then removed, usually by distillation. The catalyst intermediate obtainable in this manner is then further activated by oxidation, with the result that the novel Phillips catalyst is finally formed.

In the preparation of the novel Phillips catalyst, the catalyst intermediate is activated at relatively high temperatures in an oxidizing atmosphere, with the result that the finely divided Phillips catalyst supported on silicon aluminum phosphate is formed. In terms of the method, this activation step has no special features but can be carried out in a conventional and known manner by heating the catalyst intermediate at from 300° to 900° C., preferably from 500° to 750° C. It is known that the catalyst intermediate is heated in an oxidizing atmosphere. Examples of suitable oxidizing atmospheres are pure oxygen, oxygen/noble gas mixtures or an air stream, of which air is particularly preferably used for reasons of cost effectiveness. In general, the activation time is from 30 minutes to 24 hours, advantageously from 1 to 10 hours.

Before being used, the Phillips catalyst may furthermore be modified by treatment with ethylene and/or α-olefins, for example propylene, but-1-ene, pent-1-ene and hex-1-ene, or with carbon monoxide, a trialkylborane, such as triethylborane, or a trialkylaluminum, for example triethylaluminum. It may also be subjected to halogenation, especially fluoridation, or silylation.

The Phillips catalyst according to the invention is very useful for the preparation of polymers of α-olefins, in particular of homo- and copolymers of ethylene by the Phillips process. Suitable polymerization reactors are the conventional and known loop reactors, autoclaves, gas phase reactors with stirrers and gas phase fluidized-bed reactors. The polymerization can be carried out not only in the gas phase but in solution, for example in an inert hydrocarbon, such as isobutane, or in a suspension.

Examples of suitable α-olefins which can be copolymerized with ethylene are propylene, but-1-ene, pent-1-ene, hex-1-ene and oct-1-ene, and the conjugated and nonconjugated diolefins butadiene, penta-1,3-diene, 2,3-dimethylbutadiene, penta-1,4-diene, hexa-1,5-diene and vinylcyclohexene. In general, the comonomers are added to the ethylene in an amount such that ethylene copolymers of from 96 to 99.8% by weight of polymerized ethylene and from 0.2 to 4% by weight of at least one polymerized comonomer are formed.

The polymerization with the aid of the novel Phillips catalyst is preferably carried out at from 70° to 150° C., particularly preferably from 90° to 110° C., and from 2 to 150, particularly preferably from 20 to 80, bar. Moreover, polymerization can also be carried out in the presence of regulators conventionally used in polymerization technology, for example in the presence of hydrogen. The polymerization can be carried out either continuously or batchwise.

The novel Phillips catalyst gives polymers of α-olefins, in particular ethylene homopolymers or copolymers of ethylene with minor amounts of other α-olefins, for example propylene, but-1-ene, pent-1-ene, hex-1-ene or oct-1-ene.

The novel Phillips catalyst is also particularly suitable for the preparation of high molecular weight HDPE having a broad molecular weight distribution. By the concomitant use of reducing cocatalysts, for example triethylborane or triethylaluminum, it is also possible to obtain low molecular weight polymers. Such polyethylenes have densities of from 0.90 to 0.97, in particular from 0.91 to 0.96, g/cm³.

Compared with Phillips catalyst systems which are likewise fixed on a carrier having a clearly defined structure, the novel Phillips catalyst exhibits in particular a high productivity. Owing to the defined structure of its carrier, the novel Phillips catalyst is also particularly suitable for the investigation of structure/activity mechanisms in polymerization catalysts. The α-olefin polymers thus obtained can be readily processed and can be used, inter alia, for the production of films and moldings.

EXAMPLE AND COMPARATIVE EXPERIMENT

EXAMPLE a) Preparation of a Phillips catalyst

In a 1 l glass flask, 100 g of a silicon aluminum phosphate carrier of the formula

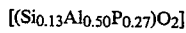

$$[(Si_{0.13}Al_{0.50}P_{0.27})O_2]$$

having a pore volume of 0.6 cm3/g and an equivalent specific surface area of 380 m²/g were digested in 300 ml of methanol under nitrogen at room temperature. A solution of 7.2 g of $Cr(NO_3)_3.9H_2O$ in 80 ml of methanol is added at 50° C. to the suspension obtained., and the resulting mixture was stirred for 10 minutes. The methanol was then stripped off in a rotary evaporator.

The catalyst intermediate obtained in this manner was then activated in an air stream in a fluidized bed activator for two hours at 650° C. The resulting Phillips catalyst had a chromium content of 0.8% by weight, determined by elemental analysis.

b) Polymerization

A 1 l pressure autoclave was heated to 95° C., flushed several times with ethylene and filled with 500 ml of isobutane while stirring. Ethylene was then forced into the autoclave until the total pressure in the auto-clave was 40 bar. Thereafter, 120 mg of the Phillips catalyst prepared under a) were introduced into the autoclave via a metering lance, after which polymerization was carried out for a total of 90 minutes. Consumed ethylene was replenished continuously in the course of the polymerization. After 90 minutes, the polymerization was terminated by letting down the pressure.

130 g of grit-like polyethylene were obtained from the novel Example. The limiting viscosity number Jg and the density of the resulting polyethylene, as well as the productivity of the Phillips catalyst used, are shown in the Table below.

COMPARATIVE EXPERIMENT a) Preparation of a Phillips catalyst

A Phillips catalyst was prepared by a procedure similar to that described in novel Example a), except that a zeolite carrier ZSM-5 which was similar to that of EP-A 075 421 and contained, inter alia, 0.01% by weight of Na, 43.6% by weight of $SiO_2$ and $Al_2O_3$ was used instead of the silicon aluminum phosphate carrier of the formula $$[(Si_{0.13}Al_{0.50}P_{0.27})O_2]$$

b) Ethylene was polymerized under similar conditions according to novel Example b), and the Phillips catalyst of Comparative Experiment a) was used.

18 g of a grit-like polyethylene was obtained. The limiting viscosity number Jg and the density of the resulting polyethylene, as well as the productivity of the Phillips catalyst used, are shown in the Table below.

TABLE

| | Example | Comparative Expt. |
| --- | --- | --- |
| Limiting viscosity number $Jg^{a)}$ [$cm^3/g$] | 810 | 610 |
| Density$^{b)}$ [$g/cm^3$] | 0.949 | 0.943 |
| Productivity g polyethylene/ g Phillips catalyst | 1100 | 150 |

$^{a)}$Measured according to DIN 53,733
$^{b)}$Measured according to DIN 53,479 A The Example and the Comparative Experiment show, inter alia, that the novel Phillips catalyst exhibits in particular substantially higher productivity.

a) Measured according to DIN 53,733
b) Measured according to D IN 53,479 A

We claim:

1. A Phillips catalyst for the polymerization of α-olefins, comprising, as a catalytically active component, at least one chromium(III) compound on a silicon aluminum phosphate carrier of the formula (I)

$$(Si_xAl_yP_z)O_2 \qquad (I)$$

where x is from 0.05 to 0.5 and y and z are each from 0.1 to 1.0 said catalyst having an atomic ratio of chromium to phosphorous of from 0.1:1 to 1:0.1, and a chromium content of from 0.1 to 5.0% by weight.

2. A Phillips catalyst as claimed in claim 1, wherein a silicon aluminum phosphate carrier of the formula (I), where x is from 0.1 to 0.2, y is from 0.3 to 0.5 and z is from 0.2 to 0.6, is used.

3. A Phillips catalyst as claimed in claim 1, wherein the chromium(III) compound used is a water-soluble salt of trivalent chromium or a chromium(III) chelate complex.

4. A process for the preparation of a Phillips catalyst as claimed in claim 1, comprising converting the silicon aluminum phosphate carrier of the formula (I) in a suspension with an alkanol, then adding the chromium(III) compound to the suspension, then removing the solvent and activating by oxidation the solid thus obtained.

5. A process as claimed in claim 4, wherein the oxidative activation is carried out in an air stream at from 300° to 900° C.

* * * * *